US012002417B2

(12) United States Patent
Kim et al.

(10) Patent No.: US 12,002,417 B2
(45) Date of Patent: Jun. 4, 2024

(54) DATA DRIVER AND LED DEVICE INCLUDING THE SAME

(71) Applicant: LG Display Co., Ltd., Seoul (KR)

(72) Inventors: Ji Hun Kim, Paju-si (KR); Joon Min Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/198,136

(22) Filed: May 16, 2023

(65) Prior Publication Data

US 2023/0386395 A1 Nov. 30, 2023

(30) Foreign Application Priority Data

May 25, 2022 (KR) ........................ 10-2022-0064016

(51) Int. Cl.
*G09G 3/32* (2016.01)
*G09G 3/3275* (2016.01)

(52) U.S. Cl.
CPC ............. *G09G 3/32* (2013.01); *G09G 3/3275* (2013.01); *G09G 2310/027* (2013.01); *G09G 2310/0275* (2013.01)

(58) Field of Classification Search
CPC .. G09G 3/32; G09G 3/3275; G09G 2310/027; G09G 2310/0275; G09G 2300/0452
See application file for complete search history.

(56) References Cited

U.S. PATENT DOCUMENTS

| | | | | |
|---|---|---|---|---|
| 2016/0055803 | A1* | 2/2016 | Kim | G09G 3/3233 345/691 |
| 2021/0193052 | A1* | 6/2021 | Kim | G09G 3/3275 |
| 2021/0398472 | A1* | 12/2021 | Kim | G09G 3/3291 |
| 2023/0386395 | A1* | 11/2023 | Kim | G09G 3/32 |

* cited by examiner

*Primary Examiner* — Michael J Jansen, II
(74) *Attorney, Agent, or Firm* — Birch, Stewart, Kolasch & Birch, LLP

(57) ABSTRACT

A data driver can include a white data voltage output circuit having an Ath channel for outputting a first white data voltage and a Bth channel for outputting a second white data voltage different from the first white data voltage. The data driver can further include red, green, and blue data voltage output circuits configured to output a red data voltage, a green data voltage, and a blue data voltage, respectively. One of the Ath channel and the Bth channel can operate in a first driving condition, and the Ath channel and the Bth channel can operate together in a second driving condition.

16 Claims, 13 Drawing Sheets

DATA DRIVER AND LED DEVICE INCLUDING THE SAME

CROSS-REFERENCE TO RELATED APPLICATIONS

This application claims priority to Korean Patent Application No. 10-2022-0064016, filed in the Republic of Korea on May 25, 2022, the entire contents of which are hereby expressly incorporated by reference into the present application.

BACKGROUND OF THE DISCLOSURE

Field of the Disclosure

The present disclosure relates to a data driver and a light-emitting display (LED) device including the same.

Discussion of the Related Art

With the development of information technology, the market for display devices being used to connect between users and information is growing. Accordingly, display devices such as an LED, a quantum dot display (QDD), and a liquid crystal display (LCD) have been increasingly used.

The above display devices each include a display panel including sub-pixels, a driver which outputs a driving signal for driving of the display panel, and a power supply which generates power to be supplied to the display panel or the driver.

In such a display device, when sub-pixels formed in a display panel are supplied with driving signals, for example, a scan signal and a data signal, a selected one thereof can transmit light therethrough or can directly emit light, thereby displaying an image.

SUMMARY OF THE DISCLOSURE

Accordingly, the present disclosure is directed to a data driver and an LED device including the same that substantially obviate one or more problems due to limitations and disadvantages of the related art.

An object of the present disclosure is to express various image data signal formats (RGB/YCbCr 4:4:4/YCbCr 4:2:2/YCbCr 4:2:0) while selectively driving the display panel using one of a driving frequency of 120 Hz or a driving frequency of 240 Hz without newly designing or changing the display panel. In addition, another object of the present disclosure is to minimize an increase in a chip size of the data driver by minimizing the increase in the number of circuits required when the display panel is selectively driven using one of a driving frequency of 120 Hz or a driving frequency of 240 Hz.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the disclosure, as embodied and broadly described herein, a data driver includes a white data voltage output circuit having an Ath channel for outputting a first white data voltage and a Bth channel for outputting a second white data voltage different from the first white data voltage, and red, green, and blue data voltage output circuits for outputting a red data voltage, a green data voltage, and a blue data voltage, respectively, wherein one of the Ath channel and the Bth channel operates in a first driving condition, and the Ath channel and the Bth channel operate together in a second driving condition.

The first driving condition can be driving at a first frequency, and the second driving condition can be driving at a second frequency higher than the first frequency.

The white data voltage output circuit can include a first-A latch configured to sample a first white data signal and a first-B latch configured to sample a second white data signal, a second-A latch configured to hold the first white data signal output from the first-A latch and a second-B latch configured to hold the second white data signal output from the first-B latch, an Ath converter configured to convert the first white data signal output from the second-A latch into the first white data voltage and a Bth converter configured to convert the second white data signal output from the second-B latch into the second white data voltage, an Ath amplifier configured to amplify the first white data voltage output from the Ath converter and a Bth amplifier configured to amplify the second white data voltage output from the Bth converter, and an Ath switch configured to output the first white data voltage output from the Ath amplifier through an output terminal and a Bth switch configured to output the second white data voltage output from the Bth amplifier through an output terminal.

The white data voltage output circuit can include a first-A latch configured to sample a first white data signal and a first-B latch configured to sample a second white data signal, a second-A latch configured to hold the first white data signal output from the first-A latch and a second-B latch configured to hold the second white data signal output from the first-B latch, an Ath switch configured to transfer the first white data signal output from the second-A latch to a converter and a Bth switch configured to transfer the second white data signal output from the second-B latch to the converter, the converter configured to convert the first white data signal transferred from the Ath switch into the first white data voltage or to convert the second white data signal transferred from the Bth switch into the second white data voltage, an amplifier configured to amplify the first white data voltage or the second white data voltage output from the converter, and a switch configured to output the first white data voltage or the second white data voltage output from the amplifier through an output terminal.

One of the Ath switch and the Bth switch can be turned on under the first driving condition, and the Ath switch and the Bth switch can be turned on under the second driving condition.

In another aspect of the present disclosure, a light-emitting display (LED) device includes a display panel configured to display an image, and a data driver connected to data lines of the display panel, wherein the data driver includes a white data voltage output circuit having an Ath channel for outputting a first white data voltage and a Bth channel for outputting a second white data voltage different from the first white data voltage, and red, green, and blue data voltage output circuits for outputting a red data voltage, a green data voltage, and a blue data voltage, respectively, and one of the Ath channel and the Bth channel operates in a first driving condition, and the Ath channel and the Bth channel operate together in a second driving condition.

The first driving condition can be driving/operating at a first frequency, and the second driving condition can be driving/operating at a second frequency higher than the first frequency.

The white data voltage output circuit can include a first-A latch configured to sample a first white data signal and a first-B latch configured to sample a second white data signal, a second-A latch configured to hold the first white data signal output from the first-A latch and a second-B latch configured to hold the second white data signal output from the first-B latch, an Ath converter configured to convert the first white data signal output from the second-A latch into the first white data voltage and a Bth converter configured to convert the second white data signal output from the second-B latch into the second white data voltage, an Ath amplifier configured to amplify the first white data voltage output from the Ath converter and a Bth amplifier configured to amplify the second white data voltage output from the Bth converter, and an Ath switch configured to output the first white data voltage output from the Ath amplifier through an output terminal and a Bth switch configured to output the second white data voltage output from the Bth amplifier through an output terminal.

The white data voltage output circuit can include a first-A latch configured to sample a first white data signal and a first-B latch configured to sample a second white data signal, a second-A latch configured to hold the first white data signal output from the first-A latch and a second-B latch configured to hold the second white data signal output from the first-B latch, an Ath switch configured to transfer the first white data signal output from the second-A latch to a converter and a Bth switch configured to transfer the second white data signal output from the second-B latch to the converter, the converter configured to convert the first white data signal transferred from the Ath switch into the first white data voltage or to convert the second white data signal transferred from the Bth switch into the second white data voltage, an amplifier configured to amplify the first white data voltage or the second white data voltage output from the converter, and a switch configured to output the first white data voltage or the second white data voltage output from the amplifier through an output terminal.

One of the Ath switch and the Bth switch can be turned on under the first driving condition, and the Ath switch and the Bth switch can be turned on under the second driving condition.

The data driver can output the red data voltage, the green data voltage, and the blue data voltage together with one selected from the first white data voltage and the second white data voltage when operating under the first driving condition.

The data driver can output the first white data voltage, the second white data voltage, the red data voltage, the green data voltage, and the blue data voltage when operating under the second driving condition.

The data driver can alternately control the Ath channel and the Bth channel when operating under the second driving condition.

The display panel can separately store the first white data voltage and the second white data voltage one line at a time, and continuously stores the red data voltage, the greed data voltage, and the blue data voltage two lines at a time when operating under the second driving condition.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Reference will now be made in detail to the preferred embodiments of the present disclosure, examples of which are illustrated in the accompanying drawings. Wherever possible, the same reference numbers will be used throughout the drawings to refer to the same or like parts.

A display device according to the present disclosure can be implemented as a television, a video player, a personal computer (PC), a home theater, an automotive electric device, or a smartphone, but is not limited thereto. The display device according to the present disclosure can be implemented as an LED (light-emitting display), a QDD, or an LCD. For convenience of description, an LED device that directly emits light based on an inorganic light-emitting diode or an organic light-emitting diode will hereinafter be taken as an example of the display device according to the present disclosure.

Figure 1:
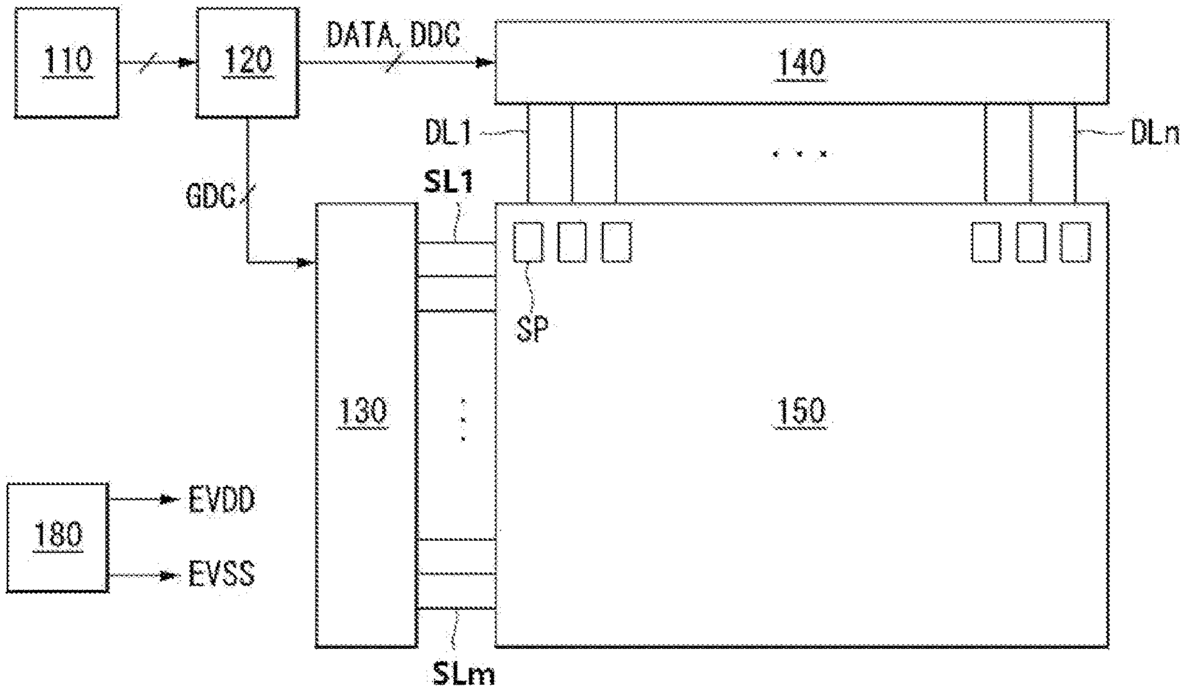
FIG. 1 is a block diagram schematically illustrating a configuration of an LED (light-emitting display) device.
Figure 2:
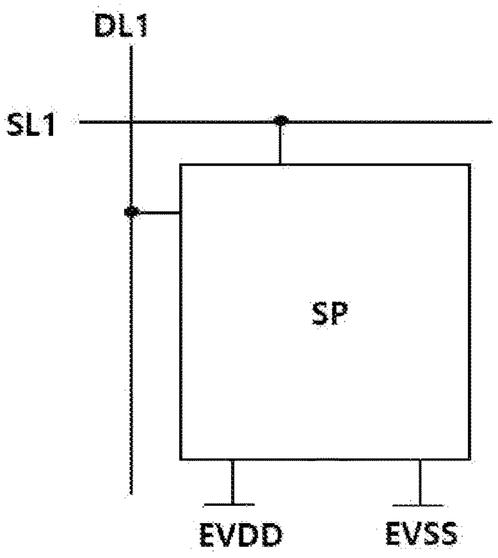
FIG. 2 is a schematic configuration diagram of a sub-pixel illustrated in FIG. 1.

FIG. 1 is a block diagram schematically illustrating a configuration of an LED (light-emitting display) device, and FIG. 2 is a schematic configuration diagram of a sub-pixel illustrated in FIG. 1.

As illustrated in FIGS. 1 and 2, the LED device can include an image supply 110, a timing controller 120, a scan driver 130, a data driver 140, a display panel 150, and a power supply 180.

The image supply (set or host system) 110 can output various driving signals together with an image data signal externally supplied or an image data signal stored in an internal memory. The image supply 110 can supply the data signal and the various driving signals to the timing controller 120.

The timing controller 120 can output a gate timing control signal GDC for control of operation timing of the scan driver 130, a data timing control signal DDC for control of operation timing of the data driver 140, and various synchronization signals (a vertical synchronization signal Vsync and a horizontal synchronization signal Hsync). The timing controller 120 can supply a data signal DATA supplied from the image supply 110 together with the data timing control signal DDC to the data driver 140. The timing controller 120 can take the form of an integrated circuit (IC) and mounted on a printed circuit board, but is not limited thereto.

The scan driver 130 can output a scan signal (or scan voltage) in response to the gate timing control signal GDC supplied from the timing controller 120. The scan driver 130 can supply the scan signal to sub-pixels included in the display panel 150 through scan lines SL1 to SLm where m can be a positive number such as an integer greater than 1). The scan driver 130 can take the form of an IC or can be formed directly on the display panel 150 in a GIP manner, but is not limited thereto.

The data driver 140 can sample and latch the data signal DATA in response to the data timing control signal DDC supplied from the timing controller 120, convert the resulting digital data signal into an analog data voltage based on a gamma reference voltage, and output the converted analog data voltage. The data driver 140 can supply the data voltage to the sub-pixels included in the display panel 150 through data lines DL1 to DLn where n can be a positive number such as an integer greater than 1). The data driver 140 can take the form of an IC and mounted on the display panel 150 or mounted on the printed circuit board, but is not limited thereto.

The power supply 180 can generate first power having a high potential and second power having a low potential based on an external input voltage externally supplied and output the generated first power and second power through a first power line EVDD and a second power line EVSS, respectively. The power supply 180 can generate and output a voltage (for example, a scan voltage including a scan high voltage and a scan low voltage) required to drive the scan driver 130 or a voltage (for example, a drain voltage including a drain voltage and a half-drain voltage) required to drive the data driver 140, as well as the first power and the second power.

The display panel 150 can display an image in response to a driving signal including the scan signal and the data voltage, the first power, and the second power. The sub-pixels of the display panel 150 directly emit light. The display panel 150 can be manufactured based on a rigid or flexible substrate of glass, silicon, polyimide, etc. The sub-pixels which emit light can form red, green and blue pixels or can form red, green, blue and white pixels. For instance, the display panel 150 can include the plurality of sub-pixels, some of which form the red, green and white pixels, and each sub-pixel or some of such sub-pixels can have the configuration shown in FIG. 2.

For example, one sub-pixel SP can be connected to a first data line DL1, a first scan line GL1, the first power line EVDD, and the second power line EVSS, and can include a pixel circuit which is composed of a switching transistor, a driving transistor, a capacitor, an organic light-emitting diode, etc. The sub-pixel SP used in the LED device directly emits light, and thus has a complex circuit configuration. Furthermore, there are various compensation circuits for compensating for deterioration of not only the organic light-emitting diode, which emits light, but also the driving transistor, which supplies driving current required to drive the organic light-emitting diode. In this regard, it should be noted that the sub-pixel SP is simply illustrated in block form.

Meanwhile, the timing controller 120, the scan driver 130, the data driver 140, etc., have been described as having individual configurations. However, one or more of the timing controller 120, the scan driver 130 and the data driver 140 can be integrated into one IC depending on a method of implementation of the LED device.

Figure 3:
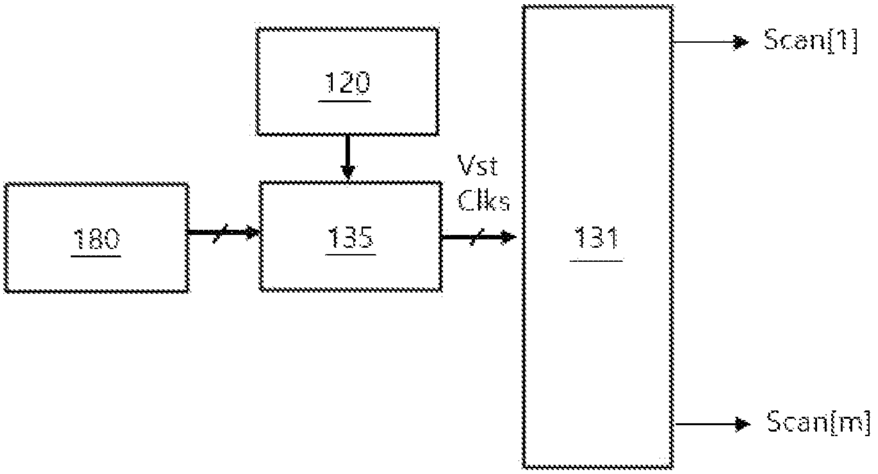
FIGS. 3 and 4 are diagrams for describing a configuration of a gate-in-panel (GIP)-type scan driver.
Figure 4:
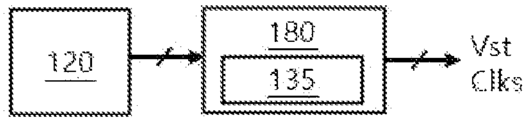
Figure 5:
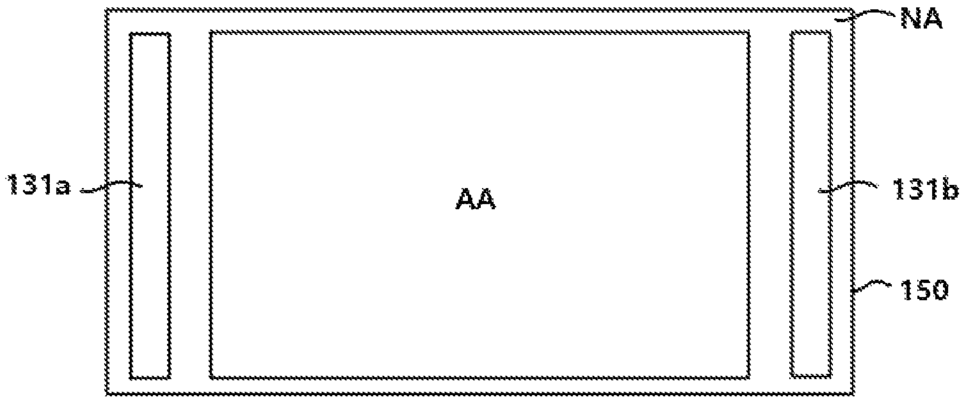
FIG. 5 is a diagram illustrating a layout example of the GIP-type scan driver.

FIGS. 3 and 4 are diagrams for describing a configuration of a GIP-type scan driver, and FIG. 5 is a diagram illustrating a layout example of the GIP-type scan driver.

As illustrated in FIG. 3, the GIP-type scan driver can include a shift register 131 and a level shifter 135. The level shifter 135 can generate driving clock signals Clks and a start signal Vst based on signals and voltages output from the timing controller 120 and power supply 180. The driving clock signals Clks can be generated in the form of J different phases (where J is an integer which is greater than or equal to 2), such as two phases, four phases, and eight phases.

The shift register 131 can operate based on the signals Clks and Vst output from the level shifter 135 and output scan signals Scan[1] to Scan[m] capable of turning on or off transistors formed on the display panel. The shift register 131 can be formed on the display panel in the form of a thin film in a GIP manner.

As illustrated in FIGS. 3 and 4, unlike the shift register 131, the level shifter 135 can independently take the form of an IC or can be included in the power supply 180. However, this is merely one example, and the level shifter 135 is not limited thereto.

As illustrated in FIG. 5, in the GIP-type scan driver, shift registers **131*a* and 131*b* for outputting scan signals can be disposed in a non-display area NA of the display panel 150. An example in which the shift registers 131*a* and 131*b* are disposed in the non-display area NA on the left and right sides is given. However, the shift registers 131*a* and 131*b* can be disposed in the non-display area NA on upper and lower sides of the display panel 150, and can be disposed in a display area AA of the display panel 150**.

Figure 6:
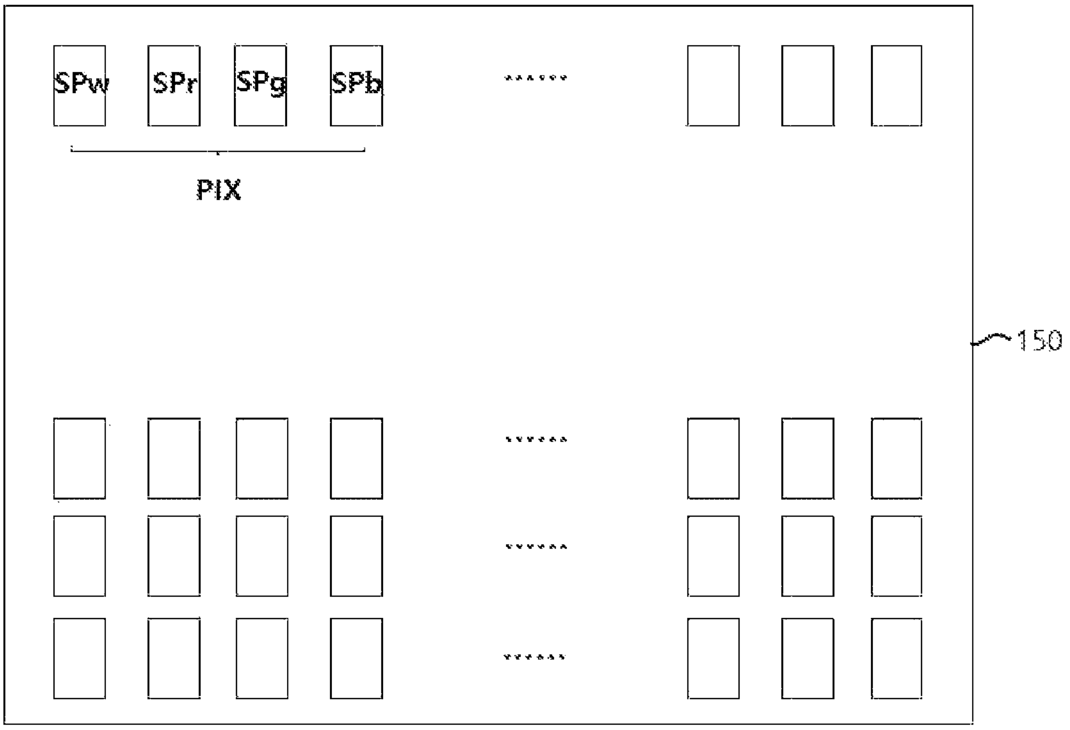
FIGS. 6 and 7 are diagrams for describing pixels disposed on a display panel and a layout example of the pixels.
Figure 7:
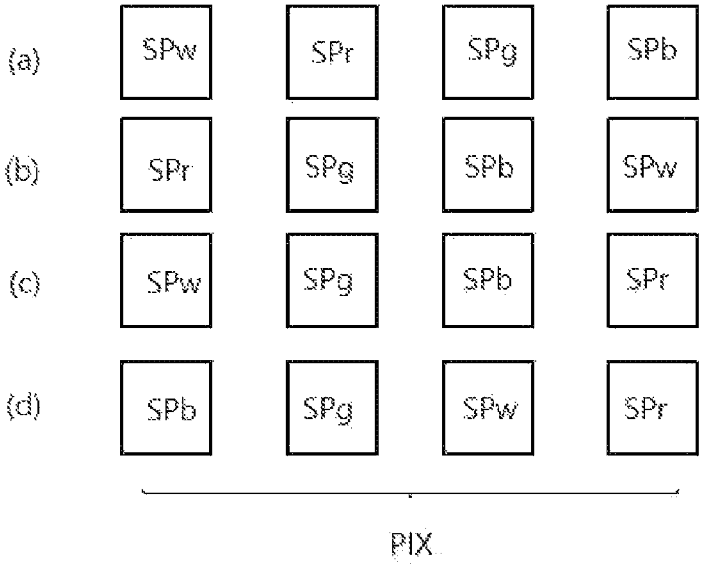

FIGS. 6 and 7 are diagrams for describing pixels disposed on the display panel and a layout example of the pixels.

As illustrated in FIG. 6, the LED device can display an image based on the display panel 150 including pixels PIX disposed in a matrix. One/each pixel PIX disposed on the display panel 150 can include a white sub-pixel SPw, a red sub-pixel SPr, a green sub-pixel SPg, and a blue sub-pixel SPb, or some variation thereof.

As illustrated in (a)-(d) of FIG. 7, a layout order of the white sub-pixel SPw, the red sub-pixel SPr, the green sub-pixel SPg, and the blue sub-pixel SPb included in one pixel PIX can vary based on a horizontal direction according to an implementation method of the display panel.

Figure 8:
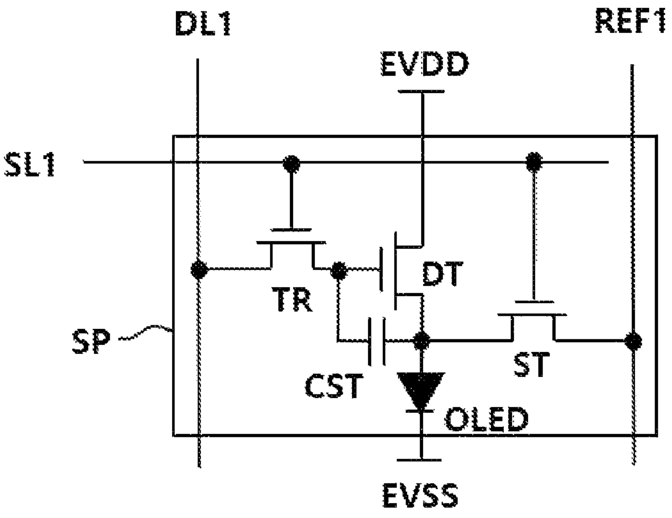
FIG. 8 is an exemplary diagram illustrating a sub-pixel having a compensation circuit.
Figure 9:
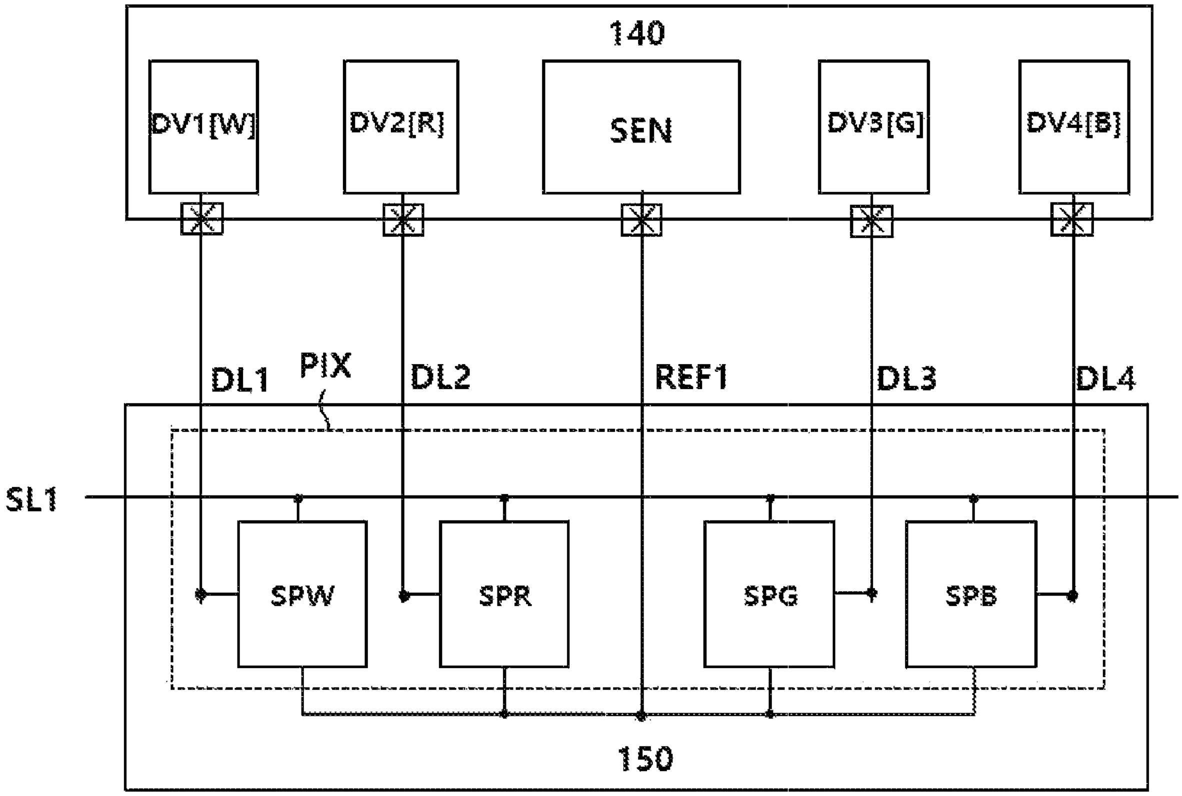
FIG. 9 is an exemplary diagram illustrating the sub-pixel having the compensation circuit and a data driver for driving the sub-pixel.

FIG. 8 is an exemplary diagram illustrating a sub-pixel having a compensation circuit, and FIG. 9 is an exemplary diagram illustrating the sub-pixel having the compensation circuit and a data driver for driving the sub-pixel. These configurations can be used in any display device of the present disclosure.

As illustrated in FIG. 8, one sub-pixel SP can include a switching transistor TR, a driving transistor DT, a sensing transistor ST, a capacitor CST, and an organic light-emitting diode OLED.

The driving transistor DT can have a gate electrode connected to a first electrode of the capacitor CST, a first electrode connected to the first power line EVDD, and a second electrode connected to an anode electrode of the organic light-emitting diode OLED. The capacitor CST can have the first electrode connected to the gate electrode of the driving transistor DT and a second electrode connected to the anode electrode of the organic light-emitting diode OLED. The organic light-emitting diode OLED can have the anode electrode connected to the second electrode of the driving transistor DT and a cathode electrode connected to the second power line EVS S.

The switching transistor TR can have a gate electrode connected to the first scan line SL1, a first electrode connected to the first data line DL1, and a second electrode connected to the gate electrode of the driving transistor DT. The sensing transistor ST can have a gate electrode connected to the first scan line SL1, a first electrode connected to a first reference line REF1, and a second electrode connected to the anode electrode of the organic light-emitting diode OLED. The switching transistor TR and the sensing transistor ST can be simultaneously turned on in response to a first scan signal applied through the first scan line SL1.

The sensing transistor ST is a kind of compensation circuit which is additionally provided to compensate for deterioration (in a threshold voltage, etc.) of the driving transistor DT or organic light-emitting diode OLED. The sensing transistor ST can enable physical threshold voltage sensing based on a source follower operation of the driving transistor DT. The sensing transistor ST can operate to acquire a sensed value through a sensing node defined between the driving transistor DT and the organic light-emitting diode OLED.

As illustrated in FIG. 9, a plurality of pixels can be disposed in the display area of the display panel 150. One pixel P can include a white sub-pixel SPW, a red sub-pixel SPR, a green sub-pixel SPG, and a blue sub-pixel SPB.

The white sub-pixel SPW, the red sub-pixel SPR, the green sub-pixel SPG and the blue sub-pixel SPB can be separately connected to the first data line DL1, the second data line DL2, the third data line DL3 and the fourth data line DL4, respectively. However, the white sub-pixel SPW, the red sub-pixel SPR, the green sub-pixel SPG and the blue sub-pixel SPB can be connected in common to the first reference line REF1 to share the first reference line REF1. For example, a total of four sub-pixels SPW, SPR, SPG and SPB included in one pixel PIX can have a structure connected to a panel sensing circuit SEN of the data driver 140 through one first reference line REF1.

The data driver 140 can be connected to the display panel 150. The panel sensing circuit SEN of the data driver 140 can acquire a sensed value from at least one of the white sub-pixel SPW, the red sub-pixel SPR, the green sub-pixel SPG, and the blue sub-pixel SPB through the first reference line REF1.

The panel driving circuit of the data driver 140 can include a white data voltage output unit DV1[W], a red data voltage output unit DV2[R], a green data voltage output unit DV3[G], and a blue data voltage output unit DV4[B]. The white data voltage output unit DV1[W], the red data voltage output unit DV2[R], the green data voltage output unit DV3[G], and the blue data voltage output unit DV4[B] can output data voltages during a data write period of the display panel 150.

The white data voltage output unit DV1[W] can supply a white data voltage to the white sub-pixel SPW connected to the first data line DL1. The red data voltage output unit DV2[R] can supply a red data voltage to the red sub-pixel SPR connected to the second data line DL2. The green data voltage output unit DV3 [G] can supply a green data voltage to the green sub-pixel SPG connected to the third data line DL3. The blue data voltage output unit DV4[B] can supply a blue data voltage to the blue sub-pixel SPB connected to the fourth data line DL4.

Figure 10:
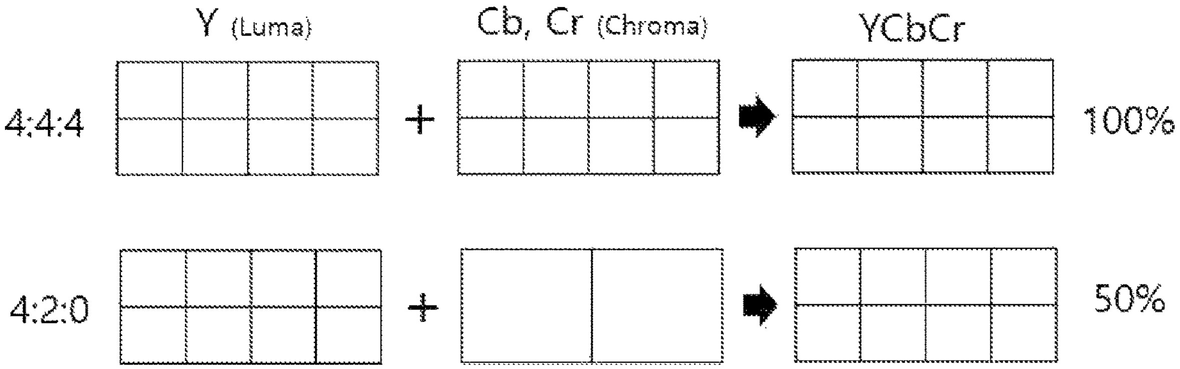
FIG. 10 is a diagram for showing a difference between a shape of a data signal and the corresponding data amount.
Figure 11:
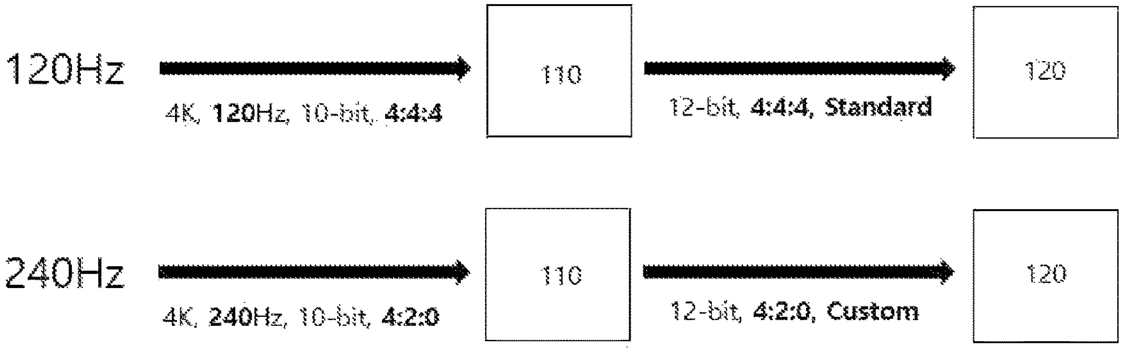
FIG. 11 is a diagram for describing a driving condition for each type of input data signal.

FIG. 10 is a diagram for showing a difference between a shape of a data signal and the corresponding data amount, and FIG. 11 is a diagram for describing a driving condition for each type of input data signal.

As illustrated in FIG. 10, a data signal for displaying an image can include a luminance component (Y (Luma)) and chromaticity components (Cb and Cr (Chroma)). As such, a data signal YCbCr of an original image implemented through video production can take the form of 4:4:4.

However, in broadcasting and video media, in order to reduce transmission capacity of data, a part can be omitted from the data signal YCbCr of the original image to obtain the form of 4:2:0, and then the signal can be transmitted. In this way, a method of reducing only the chromaticity components (Cb and Cr (Chroma)) while maintaining the luminance component (Y (Luma)) is referred to as chroma subsampling.

FIG. 10 is an example of the chroma subsampling method in which a ratio of luminance (Y), color 1 (Cb), and color 2 (Cr) included in the data signal YCbCr of the original image is compression-sampled from the form of 4:4:4 to the form of 4:2:0 (or 4:2:2). As can be seen in FIG. 10, while the data amount of the data signal YCbCr in the form of 4:4:4 is 100%, the data amount of the data signal YCbCr can be reduced to 50% by preparing the form of 4:2:0 through downsampling thereof. In this way, since data processing capacity can be reduced by downsampling the image, both an image transmitting side and an image receiving side can have many advantages in relation to signal handling.

As illustrated in FIG. 11, the data signal can be applied to the image supply 110 at a resolution of 4K, a driving frequency of 120 Hz, and data bits of 10 bits and in the form of 4:4:4, or at a resolution of 4K, a driving frequency of 240 Hz, and data bits of 10 bits and in the form of 4:2:0.

Further, as can be seen by examining the data signal supplied from the image supply 110 to the timing controller 120, the form of 4:4:4 and the form of 4:2:0 can have data bits of 12 bits. At this time, the timing controller 120 can recognize the form of 4:4:4 as a standard image, and recognize the form of 4:2:0 as a custom image.

As such, the display device such as the LED device can employ a selective driving method so as to be able to express an image based on a data signal at a driving frequency of 120 Hz and in the form of 4:4:4, or express an image based on a data signal at a driving frequency of 240 Hz and in the form of 4:2:0.

As such, since the data signal can be applied at a driving frequency of 120 Hz and in the form of 4:4:4 or at a driving frequency of 240 Hz and in the form of 4:2:0, it is preferable to implement the LED device so that a selective driving method can be employed according to characteristics of the input data signal.

However, in order to employ the selective driving method according to the characteristics of the data signal, there are improvements to be achieved, which is proposed as follows. However, for convenience of description, the display panel 150 implemented by the sub-pixels described with reference to FIGS. 8 and 9 will be described as an example.

Figure 12:
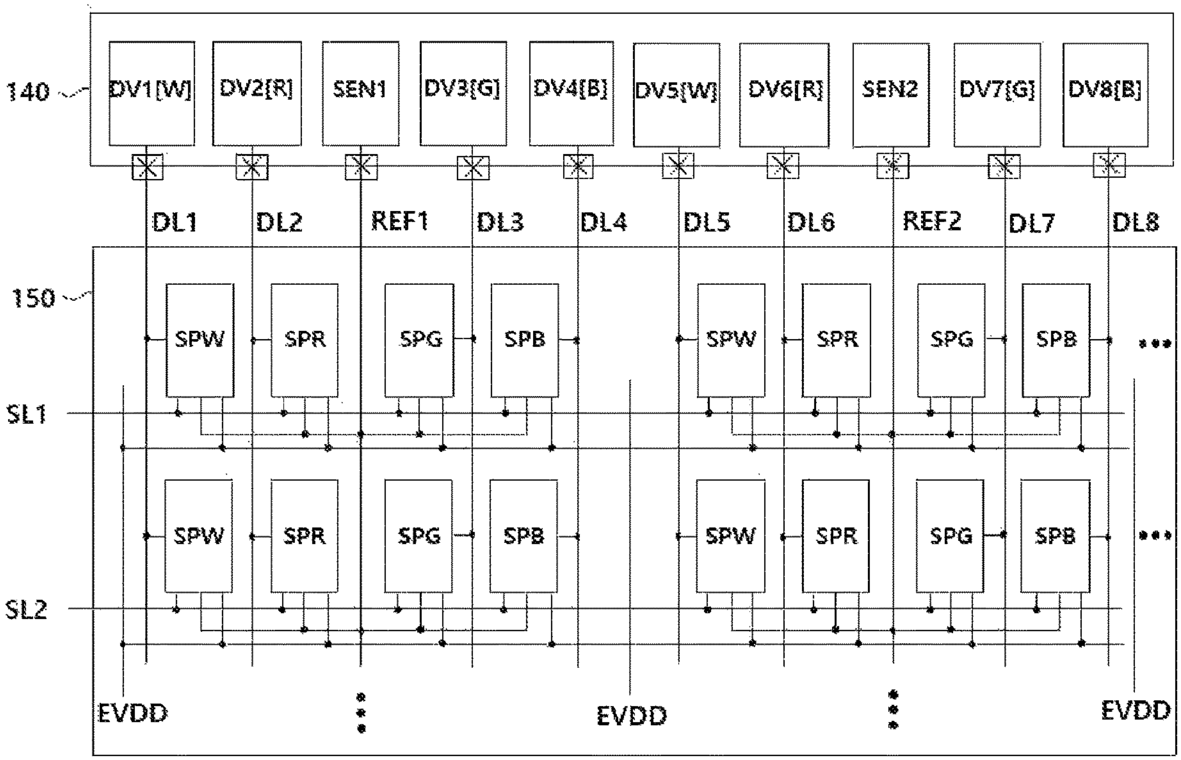
FIG. 12 is a diagram illustrating a display panel of the LED device according to a first embodiment of the present disclosure.
Figure 13:
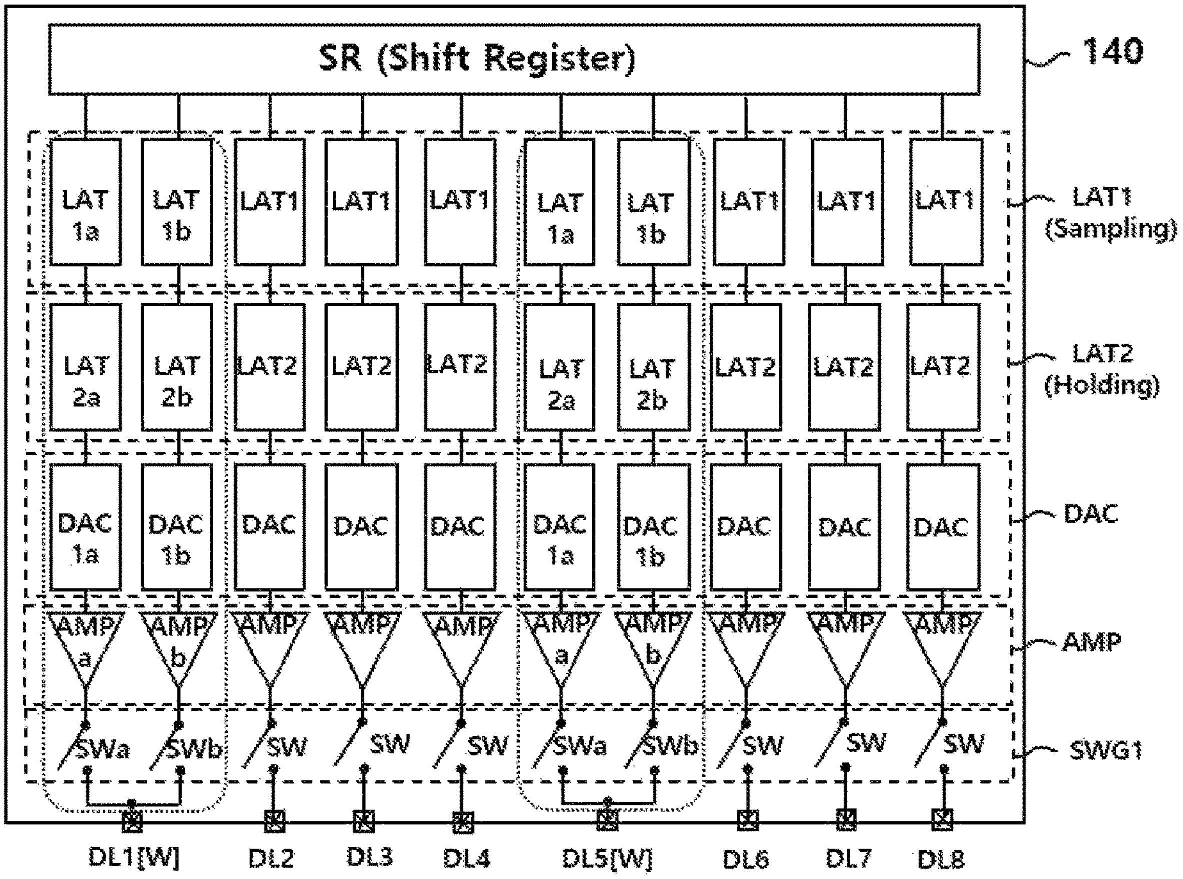
FIG. 13 is a diagram illustrating a data driver of the LED device according to the first embodiment of the present disclosure.

FIG. 12 is a diagram illustrating a display panel of the LED device according to a first embodiment of the present disclosure, and FIG. 13 is a diagram illustrating a data driver of the LED device according to the first embodiment of the present disclosure.

As illustrated in FIG. 12, a display panel 150 according to the first embodiment can be implemented based on the white sub-pixel SPW, the red sub-pixel SPR, the green sub-pixel SPG and the blue sub-pixel SPB. The white sub-pixel SPW, the red sub-pixel SPR, the green sub-pixel SPG and the blue sub-pixel SPB can be separately connected to the first data line DL1 to the eighth data line DL8, etc. disposed in a vertical direction. The white sub-pixel SPW, the red sub-pixel SPR, the green sub-pixel SPG and the blue sub-pixel SPB can be separately connected to the first scan line SL1, the second scan line SL2, etc. disposed in the horizontal direction.

The white sub-pixel SPW, the red sub-pixel SPR, the green sub-pixel SPG, and the blue sub-pixel SPB can be connected to first power lines EVDD disposed in the vertical direction and the horizontal direction. The white sub-pixel SPW, the red sub-pixel SPR, the green sub-pixel SPG, and the blue sub-pixel SPB can be connected to the first reference line REF1, a second reference line REF2, etc. so that four sub-pixels are connected in common to each of the lines. For example, first pixels separately connected to the first data line DL1 to the fourth data line DL4 can be connected in common to the first reference line REF1, and second pixels separately connected to the fifth data line DL5 to the eighth data line DL8 can be connected in common to the second reference line REF2.

The data driver 140 can include a first white data voltage output unit DV1[W], a first red data voltage output unit DV2[R], a first panel sensing circuit unit SEN1, a first green data voltage output unit DV3[G], a first blue data voltage output unit DV4[B], a second white data voltage output unit DV5[W], a second red data voltage output unit DV6[R], a second panel sensing circuit unit SEN2, a second green data voltage output unit DV7[G], a second blue data voltage output unit DV8[B], etc.

As illustrated in FIG. 13, the data driver 140 according to the first embodiment can include a shift register SR, a first data latch LAT1, a second data latch LAT2, a DA converter DAC, a voltage amplifier AMP, a switch group SWG1, etc.

The shift register SR can serve to control an operation of at least one of the first latch LAT1 or the second latch LAT2 based on a horizontal synchronization signal and a horizontal clock signal supplied from the timing controller.

The first data latch LAT1 can serve to configure a data signal for one line by sampling a data signal supplied from the timing controller. The first data latch LAT1 serves to sample a data signal, and thus can be defined as a sampling latch. The first data latch LAT1 includes a plurality of first latches, and among the first latches, a first latch that samples a data signal of a specific color, for example, a white data signal, can be divided into a first-A latch LAT1a and a first-B latch LAT1b.

The second data latch LAT2 can serve to hold a data signal transferred from the first data latch LAT1, and transfer the data signal to the DA converter DAC. The second data latch LAT2 serves to hold the data signal, and thus can be defined as a holding latch. The second data latch LAT2 includes a plurality of second latches, and among the second latches, a second latch holding a data signal of a specific color, for example, a white data signal, can be divided into a second-A latch LAT2a and a second-B latch LAT2b.

The DC converter DAC can serve to convert a digital data signal transferred from the second data latch LAT2 into an analog data voltage, and output the analog data voltage. The DC converter DAC can convert a digital data signal into an analog data voltage in conjunction with a gamma unit provided inside or outside the data driver 140. The DC converter DAC includes a plurality of converters, and among the converters, a converter that converts a data signal of a specific color, for example, a white data signal, can be divided into an Ath converter DAC1a and a Bth converter DAC1b.

The voltage amplifier AMP can server to amplify and output a data voltage transferred from the DA converter DAC. The voltage amplifier AMP includes a plurality of amplifiers, and among the amplifiers, an amplifier that amplifies a data signal of a specific color, for example, a white data signal, can be divided into an Ath amplifier AMPa and a Bth amplifier AMPb.

The switch group SWG1 can serve to output the white, red, green, and blue data voltages output from the voltage amplifier AMP through output terminals connected to the data lines DL1 to DL8. The switch group SWG1 includes a plurality of switches, and among the switches, a switch that outputs a data voltage of a specific color, for example, a white data voltage, can be divided into an Ath switch SWa and a Bth switch SWb.

The data driver 140 according to the first embodiment can include two channels in a white data voltage output circuit for driving a white sub-pixel. The first-A latch LAT1a, the second-A latch LAT2a, the Ath converter DAC1a, the Ath amplifier AMPa, and the Ath switch SWa can define an Ath channel, and the first-B latch LAT1b, the second-B latch LAT2b, the Bth converter DAC1b, the Bth amplifier AMPb, and the Bth switch SWb can define a Bth channel.

The Ath channel can output a first white data voltage, and the Bth channel can output a second white data voltage. Further, the first white data voltage and the second white data voltage can have different gradations. The Ath channel and the Bth channel can selectively operate according to a driving frequency (driving condition) for driving the LED device, which will be described below.

Figure 14:
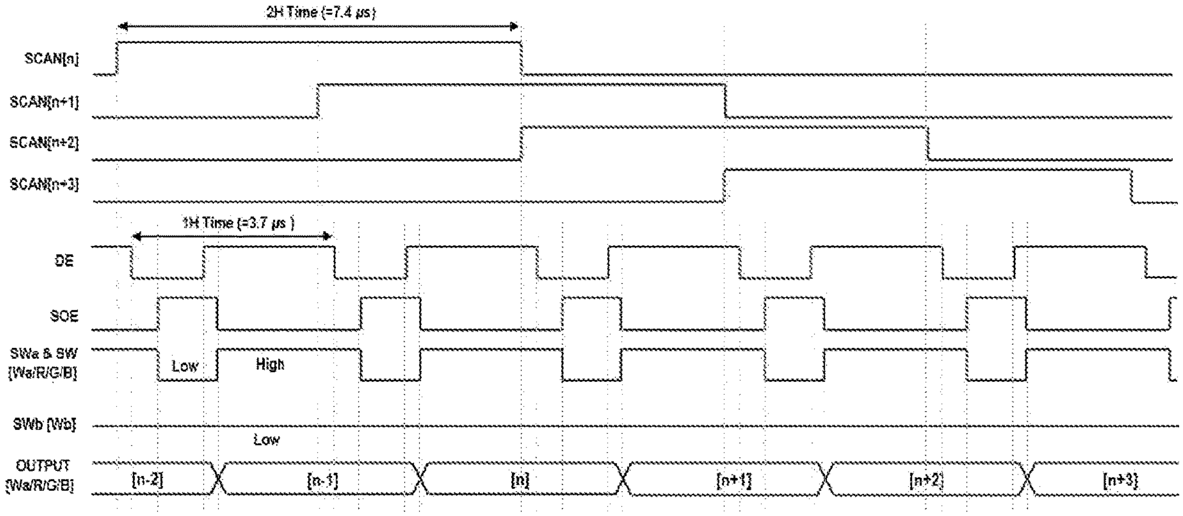
FIG. 14 is a driving waveform diagram for describing an operation of a first switch group included in the data driver and a resulting output when the LED device is driven at a driving frequency of 120 Hz according to the first embodiment of the present disclosure.
Figure 15:
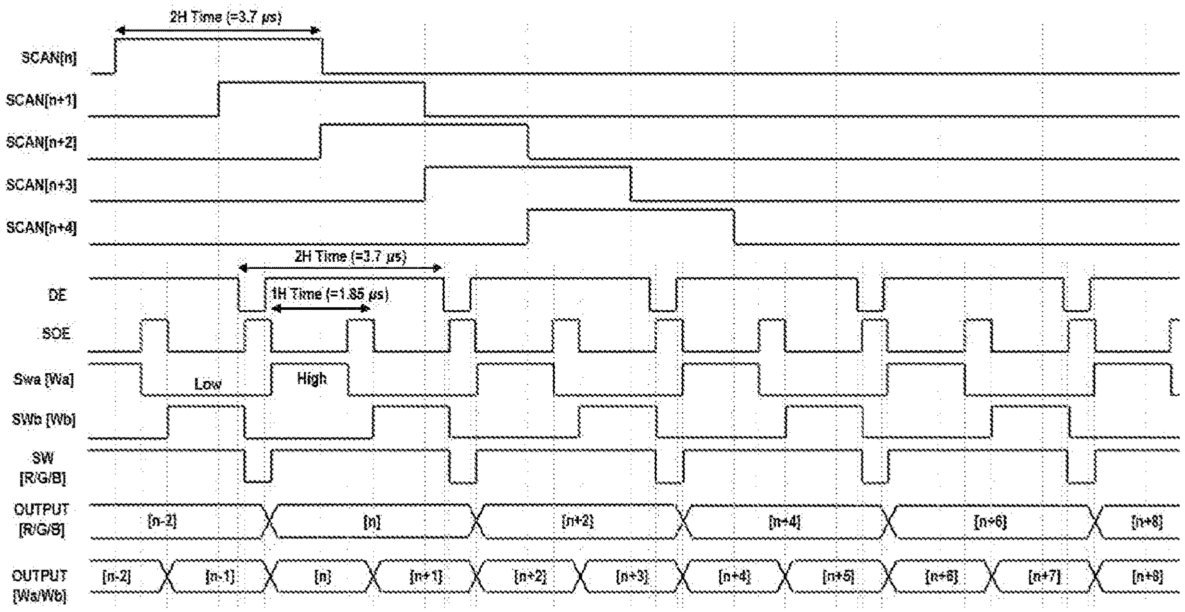
FIG. 15 is a driving waveform diagram for describing an operation of the first switch group included in the data driver and a resulting output when the LED device is driven at a driving frequency of 240 Hz according to the first embodiment of the present disclosure.

FIG. 14 is a driving waveform diagram for describing an operation of a first switch group included in the data driver and a resulting output when the LED device is driven at a driving frequency of 120 Hz according to the first embodiment of the present disclosure, and FIG. 15 is a driving waveform diagram for describing an operation of the first switch group included in the data driver and a resulting output when the LED device is driven at a driving frequency of 240 Hz according to the first embodiment of the present disclosure.

As illustrated in FIGS. 13 and 14, when the LED device is driven at a driving frequency of 120 Hz, which is a first frequency, scan signals SCAN[n] to SCAN[n+3] can be output to sequentially generate high voltages. Referring to the scan signals SCAN[n] to SCAN[n+3], high voltage generation times of a previously generated scan signal (for example, SCAN[n]) and a scan signal (for example, SCAN [n+1]) to be subsequently generated can partially overlap each other.

A data enable signal DE can be generated during a vertical synchronization signal period, which can be divided into a vertical blanking period in which a valid signal is not output and a valid data period in which a valid signal is output. For reference, the data enable signal DE illustrated in FIG. 14 represents a state occurring in the valid data period.

A source output enable signal SOE can be generated in a unit time of 1H during the valid data period of the data enable signal DE. Further, the second data latch LAT2 of the data driver 140 can output a data signal based on the source output enable signal SOE.

Meanwhile, when the LED device is driven at a driving frequency of 120 Hz, the scan signals SCAN[n] to SCAN [n+3] can maintain high voltages for time 2H (=7.4 μs), and the data enable signal DE and the source output enable signal SOE can be generated every time 1H (=3.7 μs). However, the present disclosure is not limited thereto.

According to a first driving condition of the first embodiment, in the switch group SWG1, switches SW for outputting a red data voltage, a green data voltage, and a blue data voltage [R/G/B] and the Ath switch SWa for outputting a first white data voltage [Wa] can be turned on at the same time every time 1H in response to an Ath switch signal and switch signals SWa & SW.

On the other hand, in the switch group SWG1, a Bth switch SWb for outputting a second white data voltage [Wb] can remain turned off in response to a Bth switch signal SWb. Meanwhile, in FIG. 14, since the Ath switch signal SWa and the switch signals SW are generated in the same form, it should be noted that the signals are collectively illustrated and described.

The Ath switch signal and the switch signals SWa & SW can be generated to have a phase opposite to that of the source output enable signal SOE. For example, when the source output enable signal SOE is generated as high, the Ath switch signal and the switch signals SWa & SW can be generated as low, and when the source output enable signal SOE is generated as low, the Ath switch signal and the switch signals SWa & SW can be generated as high.

When the Ath switch SWa and the switches SW operate under the above conditions, the data driver 140 can output the first white data voltage, the red data voltage, the green data voltage, and the blue data voltage [Wa/R/G/B] through an output terminal OUTPUT separately for each line (for example, [n−2], [n−1], and [n] to [n+3]).

Referring to the above description, when the LED device is driven at a driving frequency of 120 Hz, the data driver 140 can output the first white data voltage [Wa] by driving only the Ath channel (or output the second white data voltage [Wb] using only the Bth channel). The first white data voltage, the red data voltage, the green data voltage, and the blue data voltage [Wa/R/G/B] output from the output terminal OUTPUT of the data driver 140 can be changed every time 1H.

When the data driver 140 outputs the data voltage in the above form, the display panel can display images in response to all image data signal formats (RGB/YCbCr 4:4:4/YCbCr 4:2:2/YCbCr 4:2:0).

As illustrated in FIGS. 13 and 15, when the LED device is driven at a driving frequency of 240 Hz, which is a second frequency, the scan signals SCAN[n] to SCAN[n+3] can be output to sequentially generate high voltages. Referring to the scan signals SCAN[n] to SCAN[n+3], high voltage generation times of a previously generated scan signal (for example, SCAN[n]) and a scan signal (for example, SCAN [n+1]) to be subsequently generated can partially overlap each other.

The data enable signal DE can be generated during a vertical synchronization signal period, which can be divided into a vertical blanking period in which a valid signal is not output and a valid data period in which a valid signal is output. For reference, the data enable signal DE illustrated in FIG. 15 represents a state occurring in the valid data period.

The source output enable signal SOE can be generated in a unit of time 1H during the valid data period of the data enable signal DE. Further, the second data latch LAT2 of the data driver 140 can output a data signal based on the source output enable signal SOE.

Meanwhile, when the LED device is driven at a driving frequency of 240 Hz, the scan signals SCAN[n] to SCAN [n+3] can maintain high voltages for time 2H (=3.7 μs), the data enable signal DE can be generated every time 2H (=3.7 μs), and the source output enable signal SOE can be generated every time 1H (=1.85 μs). However, the present disclosure is not limited thereto.

According to a second driving condition of the first embodiment, in the switch group SWG1, the switches SW for outputting the red data voltage, the green data voltage, and the blue data voltage [R/G/B] can be turned on every time 2H in response to the switch signals SW. Further, the Ath switch SWa for outputting the first white data voltage [Wa] and the Bth switch SWb for outputting the second white data voltage [Wb] can be separately turned on every time 1H (alternately turned on at a cycle of time 1H). To this end, when the Ath switch SWa is generated as high for a first time, the Bth switch SWb can be generated as low, and when the Ath switch SWa is generated as low for a second time, the Bth switch SWb can be generated as high. Further, a period in which the Ath switch SWa and the Bth switch SWb are generated as high can correspond to a period in which the source output enable signal SOE is generated as low.

When the Ath switch SWa, the Bth switch SWb, and the switches SW operate under the above conditions, the data driver 140 can alternately output the first white data voltage and the second white data voltage [Wa/Wb] through the output terminal OUTPUT, and can continuously output the red data voltage, the green data voltage, and the blue data voltage [R/G/B].

Referring to the above description, when the LED device is driven at a driving frequency of 240 Hz, the data driver 140 can alternately drive the Ath channel and the Bth channel at a cycle of time 1H (two channels are driven together and alternated) to separately output the first and second white data voltages [Wa/Wb] to be supplied to the white sub-pixel for each line (for example, [n−2], [n−1], and [n] to [n+8]). For example, the first white data voltage [Wa]

and the second white data voltage [Wb] output from the output terminal OUTPUT of the data driver 140 can be changed every time 1H (for example, Wa is output to [n−2], and Wb is output to [n−1]). As a result, white data voltages of different gradations can be applied to white sub-pixels vertically adjacent to each other. On the other hand, the red data voltage, the green data voltage, and the blue data voltage [R/G/B] output from the output terminal OUTPUT of the data driver 140 can be changed every time 2H. As a result, red, green, and blue data voltages of the same gradation can be applied to red, green, and blue sub-pixels vertically adjacent to each other.

Meanwhile, when the red data voltage, the green data voltage, and the blue data voltage [R/G/B] are changed every time 2H, and the first white data voltage [Wa] and the second white data voltage [Wb] are changed every time 1H, a data transmission bandwidth can be increased compared to a 120 Hz driving condition (for example, about 25% increase based on EPI bandwidth).

When the data driver 140 outputs the data voltage in the above form, the display panel can express an image optimized for a chroma subsampled image data signal format (YCbCr 4:2:0).

Hereinafter, a second embodiment of the present disclosure will be described. However, a changed configuration or method compared to the first embodiment will be mainly described below. Therefore, the first embodiment is applied to parts not described in the second embodiment.

Figure 16:
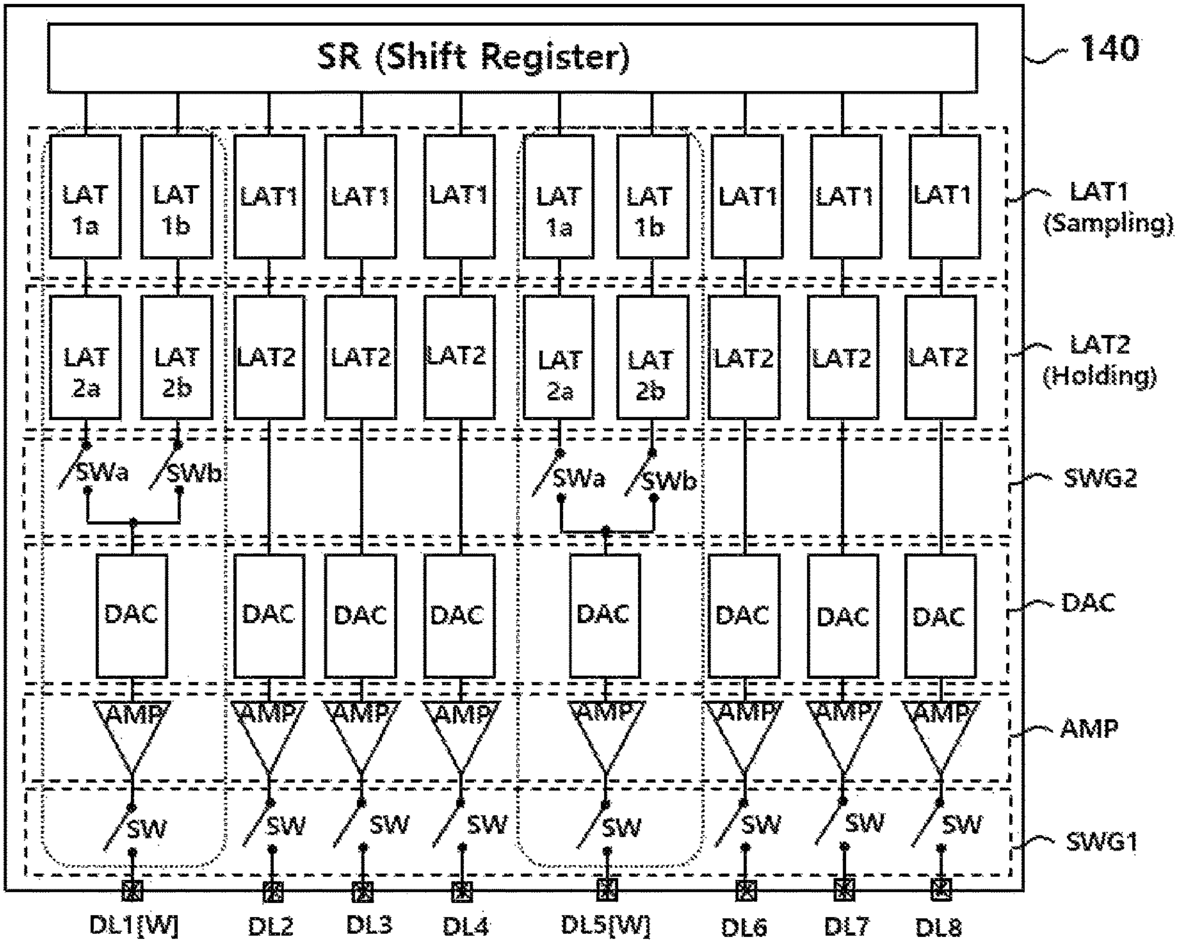
FIG. 16 is a diagram illustrating a data driver of an LED device according to a second embodiment of the present disclosure.

FIG. 16 is a diagram illustrating a data driver of an LED device according to the second embodiment of the present disclosure.

As illustrated in FIG. 16, a data driver 140 according to the second embodiment can include a shift register SR, a first data latch LAT1, a second data latch LAT2, a second switch group SWG2, a DA converter DAC, a voltage amplifier AMP, a first switch group SWG1, etc.

The second switch group SWG2 can serve to selectively transfer a data signal of a specific color, for example, a white data signal output from the second data latch LAT2 to the DA converter DAC. The second switch group SWG2 includes a plurality of second switches, which can be divided into an Ath switch SWa connected to a second-A latch LAT2a and a Bth switch SWb connected to a second-B latch LAT2b.

The DC converter DAC can serve to convert a digital data signal transferred from the second data latch LAT2 and the second switch group SWG2 into an analog data voltage, and output the analog data voltage. The DC converter DAC can convert a digital data signal into an analog data voltage in conjunction with a gamma unit (providing a gamma reference voltage) provided inside or outside the data driver 140. The DC converter DAC can include a plurality of converters.

The voltage amplifier AMP can server to amplify and output a data voltage transferred from the DA converter DAC. The voltage amplifier AMP can include a plurality of amplifiers.

The first switch group SWG1 can serve to output the white, red, green, and blue data voltages output from the voltage amplifier AMP through output terminals connected to the data lines DL1 to DL8. The first switch group SWG1 can include a plurality of first switches.

The data driver 140 according to the second embodiment can include two channels in a white data voltage output circuit for driving a white sub-pixel. The first-A latch LAT1a, the second-A latch LAT2a, and the Ath switch SWa can be defined as an Ath channel, and the first-B latch LAT1b, the second-B latch LAT2b, and the Bth switch SWb can be defined as a Bth channel.

The Ath channel can output a first white data voltage, and the Bth channel can output a second white data voltage. Further, the first white data voltage and the second white data voltage can have different gradations. The Ath channel and the Bth channel can selectively operate according to a driving frequency (driving condition) for driving the LED device, which will be described below.

Figure 17:
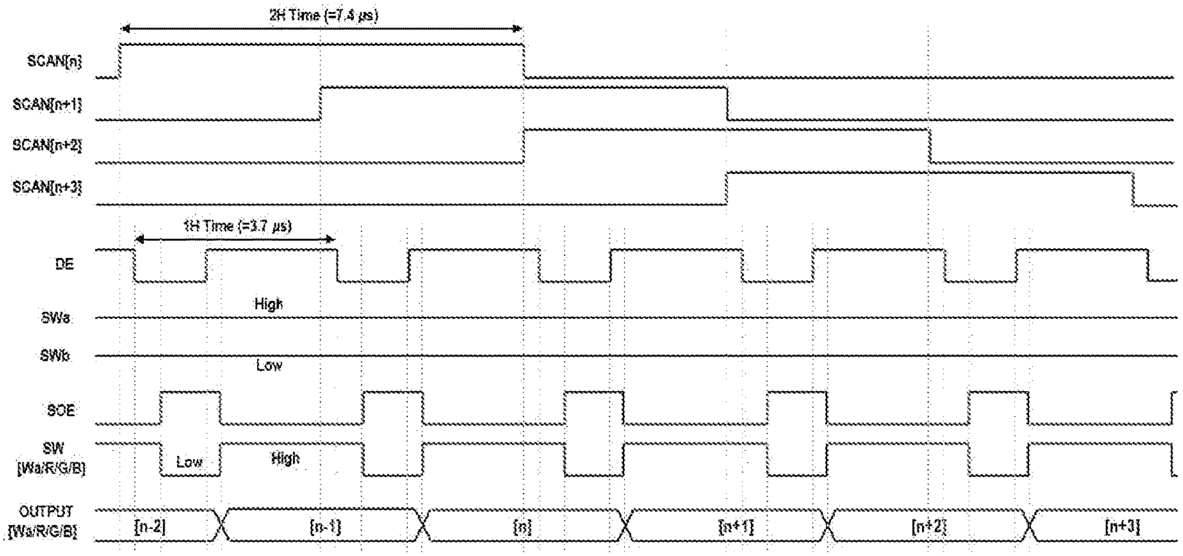
FIG. 17 is a driving waveform diagram for describing an operation of first and second switch groups included in the data driver and a resulting output in the case of driving at a driving frequency of 120 Hz according to the second embodiment of the present disclosure.
Figure 18:
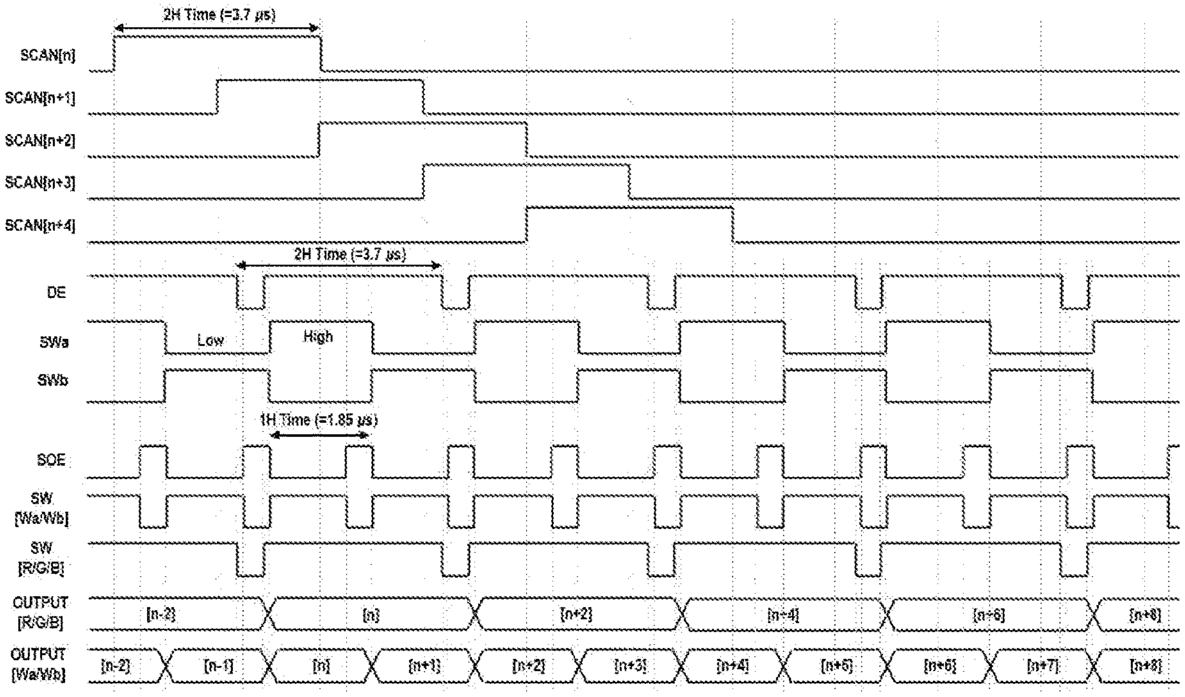
FIG. 18 is a driving waveform diagram for describing an operation of the first and second switch groups included in the data driver and a resulting output in the case of driving at a driving frequency of 240 Hz according to the second embodiment of the present disclosure.

FIG. 17 is a driving waveform diagram for describing an operation of the first and second switch groups included in the data driver and a resulting output in the case of driving at a driving frequency of 120 Hz according to the second embodiment of the present disclosure, and FIG. 18 is a driving waveform diagram for describing an operation of the first and second switch groups included in the data driver and a resulting output in the case of driving at a driving frequency of 240 Hz according to the second embodiment of the present disclosure.

As illustrated in FIGS. 16 and 17, when the LED device is driven at a driving frequency of 120 Hz, which is a first frequency, scan signals SCAN[n] to SCAN[n+3] can be output to sequentially generate high voltages. Referring to the scan signals SCAN[n] to SCAN[n+3], high voltage generation times of a previously generated scan signal (for example, SCAN[n]) and a scan signal (for example, SCAN [n+1]) to be subsequently generated can partially overlap each other.

A data enable signal DE can be generated during a vertical synchronization signal period, which can be divided into a vertical blanking period in which a valid signal is not output and a valid data period in which a valid signal is output. For reference, the data enable signal DE illustrated in FIG. 17 represents a state occurring in the valid data period.

When the LED device is driven at a driving frequency of 120 Hz, the scan signals SCAN[n] to SCAN[n+3] can maintain high voltages for time 2H (=7.4 μs), and the data enable signal DE and the source output enable signal SOE can be generated every time 1H (=3.7 μs). However, the present disclosure is not limited thereto.

According to a first driving condition of the second embodiment, in the second switch group SWG2, the Ath switch SWa for outputting the first white data signal can remain turned on in response to the Ath switch signal SWa being high. On the other hand, in the second switch group SWG2, the Bth switch SWb for outputting the second white data signal can remain turned off in response to the Bth switch signal SWb being low.

In the first switch group SWG1, switches SW for outputting the red data voltage, the green data voltage, and the blue data voltage [R/G/B] and switches SW for outputting the first white data voltage [Wa] can be equally turned on every time 1H in response to the switch signal SW. Meanwhile, in FIG. 17, since the switches SW for outputting the first white data voltage, the red data voltage, the green data voltage, and the blue data voltage [Wa/R/G/B] are generated in the same form, it should be noted that the signals are collectively illustrated and described.

The Ath switch signal and the switch signals SWa & SW can be generated to have a phase opposite to that of the source output enable signal SOE. For example, when the source output enable signal SOE is generated as high, the Ath switch signal and the switch signals SWa & SW can be generated as low, and when the source output enable signal SOE is generated as low, the Ath switch signal and the switch signals SWa & SW can be generated as high.

When the Ath switch SWa and the Bth switch SWb operate under the above conditions, the data driver 140 can output the first white data voltage, the red data voltage, the green data voltage, and the blue data voltage [Wa/R/G/B] through the output terminal OUTPUT separately for each line (for example, [n−2], [n−1], and [n] to [n+3]).

Referring to the above description, when the LED device is driven at a driving frequency of 120 Hz, the data driver 140 can output the first white data voltage [Wa] by driving only the Ath channel (or output the second white data voltage [Wb] using only the Bth channel). Here, the first white data voltage, the red data voltage, the green data voltage, and the blue data voltage [Wa/R/G/B] output from the output terminal OUTPUT of the data driver 140 can be changed every time 1H.

When the data driver 140 outputs the data voltage in the above form, the display panel can display images in response to all image data signal formats (RGB/YCbCr 4:4:4/YCbCr 4:2:2/YCbCr 4:2:0).

As illustrated in FIGS. 16 and 17, when the LED device is driven at a driving frequency of 240 Hz, which is a second frequency, the scan signals SCAN[n] to SCAN[n+3] can be output to sequentially generate high voltages. Referring to the scan signals SCAN[n] to SCAN[n+3], high voltage generation times of a previously generated scan signal (for example, SCAN[n]) and a scan signal (for example, SCAN [n+1]) to be subsequently generated can partially overlap each other.

The data enable signal DE can be generated during a vertical synchronization signal period, which can be divided into a vertical blanking period in which a valid signal is not output and a valid data period in which a valid signal is output. For reference, the data enable signal DE illustrated in FIG. 17 represents a state occurring in the valid data period.

The source output enable signal SOE can be generated in a unit of time 1H during the valid data period of the data enable signal DE. Further, the second data latch LAT2 of the data driver 140 can output a data signal based on the source output enable signal SOE.

Meanwhile, when the LED device is driven at a driving frequency of 240 Hz, the scan signals SCAN[n] to SCAN [n+3] can maintain high voltages for time 2H (=3.7 μs), the data enable signal DE can be generated every time 2H (=3.7 μs), and the source output enable signal SOE can be generated every time 1H (=1.85 μs). However, the present disclosure is not limited thereto.

According to a second driving condition of the second embodiment, in the second switch group SWG2, the Ath switch SWa for outputting the first white data voltage and the Bth switch SWb for outputting the second white data voltage can be separately turned on every time 2H (alternately turned on at a cycle of time 2H). To this end, when the Ath switch SWa is generated as high for a first time, the Bth switch SWb can be generated as low, and when the Ath switch SWa is generated as low for a second time, the Bth switch SWb can be generated as high. In other words, the Ath switch SWa can be turned on when the first white data voltage is applied to an odd-numbered line based on the scan line, and the Bth switch SWb can be turned on when the second white data voltage is applied to an even-numbered line (or vice versa).

In the first switch group SWG1, the switches SW for outputting the first white data voltage [Wa] or the second white data voltage [Wb] can be separately turned on every time 2H (alternately turned on each for time 1H within time 2H). To this end, a switch signal SW applied to the switches SW for outputting the first white data voltage [Wa] or the second white data voltage [Wb] can be generated to have a phase opposite to that of the source output enable signal SOE. In the first switch group SWG1, the switches SW for outputting the red data voltage, the green data voltage, and the blue data voltage [R/G/B] can be turned on every time 2H.

When the Ath switch SWa, the Bth switch SWb, and the switches SW operate under the above conditions, the data driver 140 can alternately output the first white data voltage and the second white data voltage [Wa/Wb] through the output terminal OUTPUT, and can continuously output the red data voltage, the green data voltage, and the blue data voltage [R/G/B].

Referring to the above description, when the LED device is driven at a driving frequency of 240 Hz, the data driver 140 can alternately drive the Ath channel and the Bth channel at a cycle of time 1H (two channels are driven together and alternated) to separately output the first and second white data voltages [Wa/Wb] to be supplied to the white sub-pixel for each line (for example, [n−2], [n−1], and [n] to [n+8]). For example, the first white data voltage [Wa] and the second white data voltage [Wb] output from the output terminal OUTPUT of the data driver 140 can be changed every time 1H (for example, Wa is output to [n−2], and Wb is output to [n−1]). As a result, white data voltages of different gradations can be applied to white sub-pixels vertically adjacent to each other. On the other hand, the red data voltage, the green data voltage, and the blue data voltage [R/G/B] output from the output terminal OUTPUT of the data driver 140 can be changed every time 2H. As a result, red, green, and blue data voltages of the same gradation can be applied to red, green, and blue sub-pixels vertically adjacent to each other.

When the data driver 140 outputs the data voltage in the above form, the display panel can express an image optimized for a chroma subsampled image data signal format (YCbCr 4:2:0).

In the second embodiment, the second switch group SWG2 is disposed between the second data latch LAT2 and the DA converter DAC, and switches are selectively driven according to driving conditions. Thus, it is possible to minimize an increase in the number of DA converters DAC and voltage amplifiers AMP required for driving the white sub-pixel. For example, there is an effect in that an increase in the chip size of the data driver 140 can be minimized.

As described above, the present disclosure has an effect in that various image data signal formats (RGB/YCbCr 4:4:4/YCbCr 4:2:2/YCbCr 4:2:0) can be expressed while selectively driving the display panel using one of a driving frequency of 120 Hz or a driving frequency of 240 Hz without newly designing or changing the display panel. In addition, the present disclosure has an effect in that the increase in the chip size of the data driver can be minimized by minimizing the increase in the number of circuits required when the display panel is selectively driven using one of a driving frequency of 120 Hz or a driving frequency of 240 Hz.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A data driver comprising:

a white data voltage output circuit having an Ath channel for outputting a first white data voltage and a Bth channel for outputting a second white data voltage different from the first white data voltage; and red, green, and blue data voltage output circuits for outputting a red data voltage, a green data voltage, and a blue data voltage, respectively, wherein one of the Ath channel and the Bth channel operates in a first driving condition, and the Ath channel and the Bth channel operate together in a second driving condition.

2. The data driver according to claim 1, wherein:

the first driving condition is operating at a first frequency; and the second driving condition is operating at a second frequency higher than the first frequency.

3. The data driver according to claim 1, wherein the white data voltage output circuit comprises:

a first-A latch configured to sample a first white data signal, and a first-B latch configured to sample a second white data signal;

a second-A latch configured to hold the first white data signal output from the first-A latch, and a second-B latch configured to hold the second white data signal output from the first-B latch;

an Ath converter configured to convert the first white data signal output from the second-A latch into the first white data voltage, and a Bth converter configured to convert the second white data signal output from the second-B latch into the second white data voltage;

an Ath amplifier configured to amplify the first white data voltage output from the Ath converter, and a Bth amplifier configured to amplify the second white data voltage output from the Bth converter; and an Ath switch configured to output the first white data voltage output from the Ath amplifier through an output terminal, and a Bth switch configured to output the second white data voltage output from the Bth amplifier through an output terminal.

4. The data driver according to claim 3, wherein one of the Ath switch and the Bth switch is turned on under the first driving condition, and the Ath switch and the Bth switch are both turned on under the second driving condition.

5. The data driver according to claim 1, wherein the white data voltage output circuit comprises:

a first-A latch configured to sample a first white data signal, and a first-B latch configured to sample a second white data signal;

a second-A latch configured to hold the first white data signal output from the first-A latch, and a second-B latch configured to hold the second white data signal output from the first-B latch;

an Ath switch configured to transfer the first white data signal output from the second-A latch to a converter, and a Bth switch configured to transfer the second white data signal output from the second-B latch to the converter;

the converter configured to convert the first white data signal transferred from the Ath switch into the first white data voltage or convert the second white data signal transferred from the Bth switch into the second white data voltage;

an amplifier configured to amplify the first white data voltage or the second white data voltage output from the converter; and a switch configured to output the first white data voltage or the second white data voltage output from the amplifier through an output terminal.

6. The data driver according to claim 5, wherein one of the Ath switch and the Bth switch is turned on under the first driving condition, and the Ath switch and the Bth switch are both turned on under the second driving condition.

7. A light-emitting display (LED) device comprising:

a display panel configured to display an image; and a data driver connected to data lines of the display panel, wherein the data driver comprises:

a white data voltage output circuit having an Ath channel for outputting a first white data voltage and a Bth channel for outputting a second white data voltage different from the first white data voltage; and red, green, and blue data voltage output circuits configured to output a red data voltage, a green data voltage, and a blue data voltage, respectively, and wherein one of the Ath channel and the Bth channel operates in a first driving condition, and the Ath channel and the Bth channel operate together in a second driving condition.

8. The LED device according to claim 7, wherein:

the first driving condition is operating at a first frequency; and the second driving condition is operating at a second frequency higher than the first frequency.

9. The LED device according to claim 7, wherein the white data voltage output circuit comprises:

a first-A latch configured to sample a first white data signal, and a first-B latch configured to sample a second white data signal;

a second-A latch configured to hold the first white data signal output from the first-A latch, and a second-B latch configured to hold the second white data signal output from the first-B latch;

an Ath converter configured to convert the first white data signal output from the second-A latch into the first white data voltage, and a Bth converter configured to convert the second white data signal output from the second-B latch into the second white data voltage;

an Ath amplifier configured to amplify the first white data voltage output from the Ath converter, and a Bth amplifier configured to amplify the second white data voltage output from the Bth converter; and an Ath switch configured to output the first white data voltage output from the Ath amplifier through an output terminal, and a Bth switch configured to output the second white data voltage output from the Bth amplifier through an output terminal.

10. The LED device according to claim 9, wherein one of the Ath switch and the Bth switch is turned on under the first driving condition, and the Ath switch and the Bth switch are both turned on under the second driving condition.

11. The LED device according to claim 7, wherein the white data voltage output circuit comprises:

a first-A latch configured to sample a first white data signal, and a first-B latch configured to sample a second white data signal;

a second-A latch configured to hold the first white data signal output from the first-A latch, and a second-B latch configured to hold the second white data signal output from the first-B latch;

an Ath switch configured to transfer the first white data signal output from the second-A latch to a converter, and a Bth switch configured to transfer the second white data signal output from the second-B latch to the converter;

the converter configured to convert the first white data signal transferred from the Ath switch into the first white data voltage or convert the second white data signal transferred from the Bth switch into the second white data voltage;

an amplifier configured to amplify the first white data voltage or the second white data voltage output from the converter; and a switch configured to output the first white data voltage or the second white data voltage output from the amplifier through an output terminal.

12. The LED device according to claim 11, wherein one of the Ath switch and the Bth switch is turned on under the first driving condition, and the Ath switch and the Bth switch are both turned on under the second driving condition.

13. The LED device according to claim 7, wherein the data driver outputs the red data voltage, the green data voltage, and the blue data voltage together with one selected from the first white data voltage and the second white data voltage when operating under the first driving condition.

14. The LED device according to claim 7, wherein the data driver outputs the first white data voltage, the second white data voltage, the red data voltage, the green data voltage, and the blue data voltage when operating under the second driving condition.

15. The LED device according to claim 14, wherein the data driver alternately controls the Ath channel and the Bth channel when operating under the second driving condition.

16. The LED device according to claim 14, wherein the display panel separately stores the first white data voltage and the second white data voltage one line at a time, and continuously stores the red data voltage, the greed data voltage, and the blue data voltage two lines at a time when operating under the second driving condition.

* * * * *